UNITED STATES PATENT OFFICE

MAX DOHRN AND RALPH DIRKSEN, OF BERLIN-CHARLOTTENBURG, GERMANY, ASSIGNORS TO THE FIRM SCHERING-KAHLBAUM A. G., OF BERLIN, GERMANY

IODIDES OF 2-AMINOPYRIDINE AND ITS DERIVATIVES AND PROCESS OF MAKING SAME

No Drawing. Application filed January 6, 1928, Serial No. 245,044, and in Germany January 14, 1927.

Our invention refers to new products resulting in the treatment of chlorine iodine compounds of 2-aminopyridine with alkaline agents and to a process of making same. We have found that the chlorine iodine compounds of 2-aminopyridine and its derivatives described in U. S. Patent 1,723,457 have the property, if brought in contact with alkaline media, to rearrange into 5-iodine-2-aminopyridine and its derivatives. This rearrangement will take place in weakly alkaline as well as strongly alkaline media and can be expedited by heating. The products resulting in this treatment are useful in the production of medical preparations.

Example 1

16 grams of the hydrochloride of the chlorine iodine compound of 2-aminopyridine are dissolved in dilute hydrochloric acid. After adding 300 ccms. of a twenty per cent caustic solution the mixture is heated to boiling and is filtered directly thereafter. After the alkaline solution has cooled down 5-iodine-2-aminopyridine separates out in the form of bright white scales melting at 129° C. It has the formula

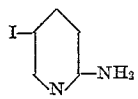

Example 2

38 grams of the hydrochloride of the chlorine iodine compound of 2-ethyl aminopyridine are treated with alkali as described with reference to Example 1. There results 5-iodine-2-ethyl aminopyridine which, after having been recrystallized in water, melts at 86° C. It has the formula

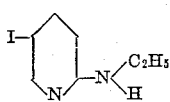

Example 3

The chlorine iodine compound of 2-isopropyl aminopyridine is heated to boiling in an excess of dilute caustic soda solution. After cooling, the alkaline solution, in which the iodine compound has separated out in the form of a dark oil, is lixiviated with ether. The ethereal residue is subjected to fractional distillation. 5-iodine-2-isopropyl aminopyridine will distil over at 132–135° C. It has the formula

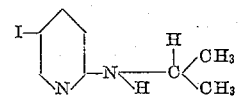

Example 4

The chlorine iodine compound of 2-isoamyl aminopyridine can be converted into 5-iodine-2-isoamyl aminopyridine by a dilute or concentrated solution of a caustic alkali, as described with reference to Example 3. The new compound forms colorless crystals melting at 59–61° C. If distilled in a vacuum of 4 mms. mercury pressure it will distil over at 145–155° C. It has the formula

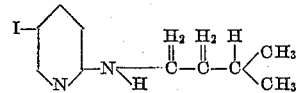

Example 5

If the chlorine iodine compound of 2-diethyl aminopyridine is treated with caustic alkali as described with reference to Example 3, there results 5-iodine-2-diethyl aminopyridine which, when subjected to fractional distillation under a vacuum of 2.5 mms. mercury pressure, will pass over between 125–129° C. It has the formula

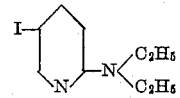

Example 6

The chlorine iodine compound of 2-amino-6-methyl-3-ethyl pyridine, on being treated with caustic alkali as described with reference to Example 3, is converted into 5-iodine-2-iso-6-methyl-3-ethylpyridine, which can easily be recrystallized from dilute alcohol and melts at 159° C. Its formula is

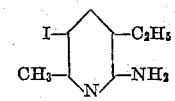

Various changes may be made in the details disclosed in the foregoing specification without departing from the invention or sacrificing the advantages thereof.

We claim:—

1. As a new product, 5-iodine-2-isoamyl aminopyridine having the formula

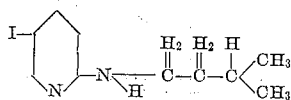

the compound forming colorless crystals melting at 59–61° C. and on being heated in vacuo under 4 mms. mercury pressure distilling over at 145–155° C.

2. The process of producing 2-aminopyridine iodised in 5-position, or its derivatives, comprising treating the chlorine iodine compound of 2-aminopyridine or its derivatives with a solution of an alkaline medium.

3. The process of producing 5-iodine-2-iso amyl aminopyridine, comprising acting on the chlorine iodine compound of 2-iso amyl aminopyridine with a caustic soda solution in excess at boiling temperature and separating the compound formed by extraction with ether.

In testimony whereof we affix our signatures.

MAX DOHRN.
RALPH DIRKSEN.